Feb. 25, 1930.  W. F. HELMOND  1,748,649
TYPEWRITING MACHINE
Filed March 25, 1929
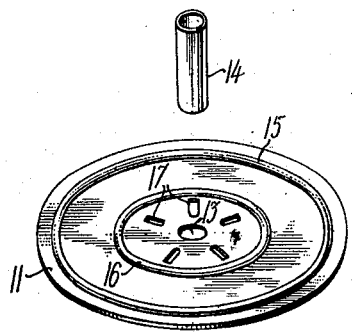
Fig. 1.
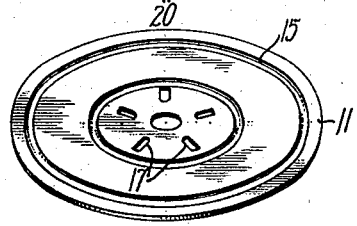
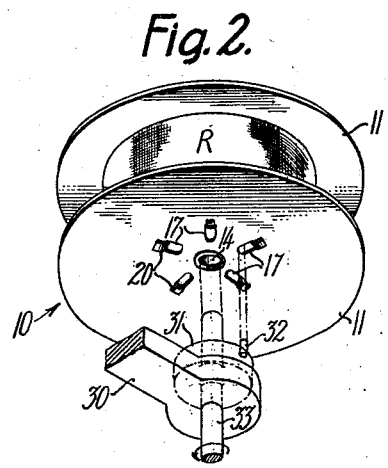
Fig. 2.
Fig. 3.
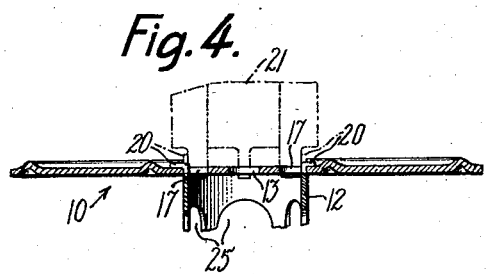
Fig. 4.
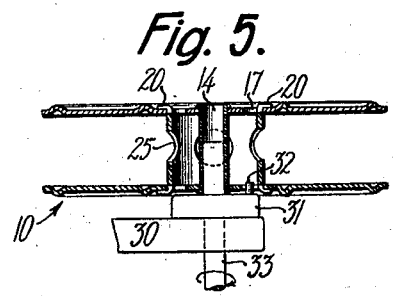
Fig. 5.
Inventor:
William F Helmond
by D C Stickney
Attorney.

Patented Feb. 25, 1930

1,748,649

UNITED STATES PATENT OFFICE

WILLIAM F. HELMOND, OF WEST HARTFORD, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed March 25, 1929. Serial No. 349,672.

This invention relates to means for rotating spools for typewriting machines, and includes features that afford advantages where the ribbon is hooked onto the spool. The two metal heads or flanges of the spool are connected by means of a core which is made of sheet-metal, having tongues which extend through perforations formed in the spool-flanges. These tongues are bent down to fasten the flanges to the core, and also to retain the core itself in its cylindrical form.

The hook is usually attached by a protruding rivet or head, which projects from the same side of the ribbon as does the hook. An objection has heretofore existed, that the protruding head of the hook-rivet has ridden upon the body of the core, forcing the hook to stand out from the core, which was an objection, making the ribbon-windings uneven, and also tending to cause some portions of the windings to be tight and others loose.

In the improved spool the core has preferably five openings or perforations that are spaced to correspond with the length of the hook on the rivet. In attaching the ribbon, the hook-end is dropped in between the flanges, and the hook enters one of the perforations in the core, and then the ribbon is wrapped around the core, and during this operation the rivet head or protuberance upon the hook falls into the adjacent hole in the spool-core. Therefore the ribbon will be found to wrap and wind evenly upon the spool, thus overcoming the objection that the hook at one end has been forced to stand away from the core, on account of the same protuberance riding upon the surface of the core. The hook itself may be curved, so as to conform to the curvature of the core. The spool may be held in the hand in any position for the purpose of attaching the ribbon, since there are many of these catch-holes in the core, and the hook may enter any one of them with the result already described, thus facilitating the operation of winding the ribbon onto the spool.

The aforesaid small perforations in the spool-flanges may be elongated radially, and thus serve to admit the guiding tongues of the tool which presses down the core-tongues upon the spool-flanges. These radial extensions of the perforations are subsequently used in driving the spool, because the driving pin or crank-wrist upon the spool-shaft may enter into any one of said perforations, thus facilitating the attachment of the spool to the driving shaft.

In the center of the spool the flanges are connected by a tubular thimble or hub, which is riveted over the flanges and fits down upon the upper end of the winding shaft in the typewriter.

Other features and advantages will hereinafter appear.

In the accompanying drawings,

Figure 1 is a disassembled view of the improved ribbon-spool of the present invention.

Figure 2 is a bottom perspective view of the ribbon-spool shown in Figure 1. In this view, the spool is shown in position to be assembled on an Underwood typewriting machine.

Figure 3 is a section through the spool shown in Figure 2, the section being taken across a core connecting the two spool-heads.

Figure 4 is a fragmentary diagrammatic view of my improved spool illustrating one step in the process of its construction.

Figure 5 is a cross-sectional view of the spool shown in Figure 2, the spool being shown attached in operative position on an Underwood typewriting machine.

In carrying out the present invention, a ribbon-spool generally designated as 10 is provided with two spool-heads or flanges 11 fastened together by a core 12, the construction of which will be described in detail hereinafter. Each of the spool-heads 11 is arranged with an axial-hole 13 for receiving a tubular thimble or bushing 14 which may be fastened to the spool-heads 11 by riveting, as illustrated in Figure 5. It will be noted that the bushing 14 is made from a single piece of sheet-metal curved to form a substantial tube.

The spool-heads 11 may each be provided with reinforcing annular ribs or beads 15 and 16. Each of the spool-heads 11 will also have five apertures 17 spaced equally distant from the hole 13 and will preferably be spaced apart equally along the arc of a circle through them. Each of the apertures 17 is preferably made in the form of an elongated hole or slot, the long axis of each slot being disposed on a radial line with respect to the axial hole 13. The outer end of each slot is square for a purpose to presently appear. Since the spools 10 will usually be mounted in a typewriting machine in a horizontal plane, the portion of each spool-head 11 disposed outwardly from the apertures 17 is left solid to protect a ribbon R wound on the spool from dust and other foreign substances.

The core 12 will preferably be made from a strip of sheet-metal curved to a substantial cylindrical form. Each end of the core 12 will have five outreaching integral tongues 20 of the same width as the elongated slots 17. The radius of the core 12 measured from its axis to the outside edge of a tongue 20 will be equal to the distances from the axis of the hole 13 to the outer end of an aperture 17. The tongues 20 will be spaced apart the same extent of angular arc as the apertures 17. This construction provides for each of the tongues 20 to enter one of the apertures 17.

To secure the spool-heads 11 on the core 12, it is only necessary to bend all of the tongues 20 down against the spool-heads 11, which can be done inexpensively by a punch-press operation, as indicated in Figure 4. It will be noted that by making the apertures 17 in the form of an elongated slot, space is provided for a punch-press tool-element 21 of a relatively large size to enter each slot 17 behind each tongue 20 for bending the latter down. This is especially desirable in manufacturing the spools in large quantities since it secures a much longer life for the tool which is employed in the operation. It will be noted that this attachment of the core 12 to the flange-heads 11 provides for fastening each flange at five different points each spaced a considerable distance from the center of the flange. This construction makes for an especially rigid spool capable of standing considerable abuse.

In the construction of the core 12, at the same time the tongues 20 are formed in the punch-press, five apertures 25 are punched in the strip from which the core 12 is made, and are spaced apart so that when the strip is curved to a cylindrical form, as noted above, the apertures will be spaced equal distances apart around the periphery of the spool. The apertures will preferably have the form of a substantial ellipse or egg-shaped hole.

The functions of the five holes 25 will now be described. The typewriter-ribbon R, suitable for being wound on the spool 10, is usually constructed with a concavo-convex metal-fastening member 27 riveted to each end of the ribbon. The outer end of the fastening member 27 usually has a portion bent inwardly to form a hook 28. A protruding rivet-head 29 is usually left at its opposite end of the member 27 on the inner or concaved face of the same. As typewriter-spools have usually been constructed they had a core with a portion cut away and a pin in said cut-out portion extending from one flange to the other for engaging the hook 28. This hook often failed to properly engage the pin in the cut-out portion and would engage an edge of core shell on one side of the cutout and the head 29 would come against the unperforated wall of the core, and the ribbon would be unevenly wound on and unwound from the core.

In the present invention, the holes 25 are spaced apart a distance so that when the hook 28 catches on either side edge of a hole 25, the head 29 will engage in the next following hole 25 in the core 12, and when the ribbon is wound around the core the fastening member 27 will lie closely up against the outer curved periphery of the core and the ribbon will wind smoothly over it and will unwind evenly from the spool. This is desirable since it allows for uniform feeding of the ribbon past the printing point.

For attaching the ribbon-spool 10 to a typewriting machine, generally designated as 30, and which includes an annular rotatable spool-supporting plate-member 31 of a usual kind, an upright pin 32 is fastened in the member 31 at a distance from its axis slightly exceeding the distance from the axis of the hole 13 to the inner edge of an aperture 17. Fastened in the rotatable member 31 and extending downwardly therefrom is a spindle 33 which may be rotated step by step in a well-known way upon operation of the typewriting machine. A portion of the spindle 33 is arranged to project upwardly past the upper face of the spool-supporting member 31 for engagement in the thimble 14. It can be readily seen by inspection of Figure 5 that the spool 10 may be operatively connected to a typewriting machine by simply placing the spool over the spindle 33 so that the latter engages in the thimble 14 and then rotating the spool slowly, preferably in a forward direction, until the pin 32 engages in one of the apertures 37, whereupon the spool will drop down into its proper operative position.

Variations may be resorted to within the scope of the invention, and portions of the improvements may be used without others.

Having thus described my invention, I claim:

1. The combination with a stretch of typewriter-ribbon having a fastening member secured to each end, said members having hooking means, and a ribbon-fastening protuberance on said member, of a ribbon-spool having a tubular core with a plurality of holes through its shell, each hole arranged for receiving said hooking means, said holes arranged so that when said means is hooked in one of said holes said protuberance will engage in the following hole, whereby said fastening member may lie snugly against the wall of said core and said ribbon may be evenly wound therearound or unwound therefrom.

2. A winding spool for a typewriter inking ribbon that has an attachment-member fastened to each of its ends and that also has a ribbon-fastening protuberance on the inner face of each of said members, said spool including two spool-heads, and a hollow core-member fastening said spool-heads together and having a plurality of apertures through its shell, each of said apertures arranged for operatively receiving said attachment-member to fasten said ribbon to said core, the shell of said core having approximately the same curvature as the concave curve of said curved member, said protuberance engaging in one of said apertures of said core when said attachment-member engages said core.

3. In a ribbon-spool of the kind described, in combination, two circular spool-heads oppositely disposed in parallel planes, each spool-head having an axial hole therethrough and a plurality of elongated slots radially disposed with respect to said hole, a thimble for receiving a spindle for mounting said spool on a typewriting machine, said thimble extending between said axial holes and fastened to each of said heads, and a tubular ribbon-winding core between said spool-heads, said core having outreaching integral tongues on each end, one for each of said elongated slots in the adjacent spool-head, one of said tongues at each end of said core arranged for passing through one of said slots and being bent down against the outer face of the adjacent spool-head, said core having a plurality of ribbon-fastening apertures in its shell for the purpose set forth.

WILLIAM F. HELMOND.